United States Patent [19]

Matsuyama et al.

[11] Patent Number: 4,709,993
[45] Date of Patent: Dec. 1, 1987

[54] LIQUID CRYSTAL COLOR DISPLAY DEVICE HAVING PLURAL COLOR FILTERS PER SEGMENT ELECTRODE

[75] Inventors: Shigeru Matsuyama; Mikio Kanazaki, both of Mobara; Norio Aoki, Chiba; Akira Ishii, Mobara, all of Japan

[73] Assignees: Hitachi, Ltd., Tokyo; Hitachi Device Engineering Co., Ltd., Chiba, both of Japan

[21] Appl. No.: 942,634

[22] Filed: Dec. 17, 1986

[30] Foreign Application Priority Data

Dec. 18, 1985 [JP] Japan .................. 60-282933

[51] Int. Cl.$^4$ ............................... G02F 1/13
[52] U.S. Cl. ................... 350/339 F; 350/336; 350/333
[58] Field of Search ............ 350/333, 339 F, 336

[56] References Cited

U.S. PATENT DOCUMENTS

| | | | |
|---|---|---|---|
| 4,410,887 | 10/1983 | Stolov et al. | 350/339 F X |
| 4,579,424 | 4/1986 | Matsukawa et al. | 350/339 F X |
| 4,610,507 | 9/1986 | Kamamori et al. | 350/339 F X |
| 4,639,088 | 1/1987 | Suginoya et al. | 350/339 F |
| 4,659,182 | 4/1987 | Aizawa | 350/339 F |
| 4,673,252 | 6/1987 | Kugo et al. | 350/336 X |

FOREIGN PATENT DOCUMENTS 57-102611  6/1982  Japan .
57-172386 10/1982  Japan .

*Primary Examiner*—Stanley D. Miller
*Assistant Examiner*—Richard F. Gallivan
*Attorney, Agent, or Firm*—Antonelli, Terry & Wands

[57] ABSTRACT

A liquid crystal color display device comprising at least two kinds of plural color filter members provided for patterned electrodes serving to apply an electric field across a liquid crystal layer sandwiched therebetween, each of the above-mentioned at least two kinds of color filter members transmitting light having wavelengths representative of a particular color, in which at least one of the color filter members is constituted by a combination of at least two kinds of filter members segmented to a degree unresolvable by the eyes specifically arranged.

17 Claims, 7 Drawing Figures

LIQUID CRYSTAL COLOR DISPLAY DEVICE HAVING PLURAL COLOR FILTERS PER SEGMENT ELECTRODE

BACKGROUND OF THE INVENTION

This invention relates to a liquid crystal color display device, and more particularly to a liquid crystal color display device which includes locally different color display elements in one and the same device.

A liquid crystal color display device designed, for example, for automobile use, includes, for example, a bar-type display part for displaying the speed of an automobile in different colors. The bar is divided into, for example, four zones consisting of a green color zone, a yellow color zone, an orange color zone and a red color zone, and these color zones are progressively illuminated in the order of from the green color zone to the red color zone with an increase in the speed of the automobile.

As a means for exhibiting such locally different hues or exhibiting desired hues at desired portions only of a display pattern in one and the same display element in a liquid crystal color display device, a method is known in which a polarizing plate disposed on an upper side or a lower side of a twisted nematic type liquid crystal panel is locally colored in different colors, as disclosed in, for example, JP-A-No. 57-102611 laid open on June 25, 1982.

However, the method disclosed in the publication is defective in that, when it is desired to form a plurality of color display elements displaying colors other than the neutral color with one and the same polarizing plate means, the polarizing plate means must include polarizing plates dyed with the corresponding number of different dyes, and an increase in the cost is inevitable. In addition, the colored polarizing plate must then be bonded to the liquid crystal panel after the panel is formed. In this step, difficulty is encountered in accurately positioning the colored polarizing plate with respect to patterned display electrodes provided on the panel, and failure of accurate positioning leads to great degradation of the quality of display.

Also, a method as disclosed in, for example, JP-A-No. 57-172386 laid open on Oct. 23, 1982 is also widely known and used. According to the disclosed method, ink containing a pigment or a dye is printed as by screen printing on the surface of one of polarizing plates which is disposed nearer to a light source of a completed liquid crystal display device than the other. Three or four colors are usually printed in the same display device. In the disclosed method, black ink is printed on the area other than that occupied by the colored sections and display elements, in order to prevent misregister in printing and also to ensure a distinct display.

However, according to this method, the number of printing steps increases corresponding to the number of colors to be printed, and, when the black ink is used for the purpose of contouring, an extra printing step is additionally required. Also, since the colors are printed on the outer surface of the polarizing plate, the resistance to light is generally stressed as a matter of importance, and, from this aspect, pigments instead of dyes are selected as coloring materials. However, the use of pigments lowers the transmittance of the ink and provides a display darker than when dyes are used. Further, there is the possibility of parallax between the ink films and the electrodes due to the spacing therebetween caused by the thickness of the substrate.

SUMMARY OF THE INVENTION

It is a primary object of the present invention to provide a liquid crystal color display device which is capable of displaying multiple colors, which can be produced by a simplified manufacturing process and which is excellent in its durability and quality of display.

According to one aspect of the present invention, two or more kinds of plural filter members are specifically combined with each other to form a filter layer which is disposed in an optical path of incident light in the color liquid crystal display device, and the area ratio of the color filter members constituting the filter layer is locally changed thereby changing the hue of light passing through the filter layer.

DESCRIPTION OF THE PREFERRED EMBODIMENTS

EMBODIMENT 1

Figure 1A:
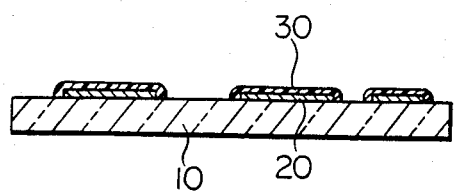
FIGS. 1a and 1b are schematic sectional views of major parts of embodiments of the liquid crystal color display device of the present invention, respectively.
Figure 1B:
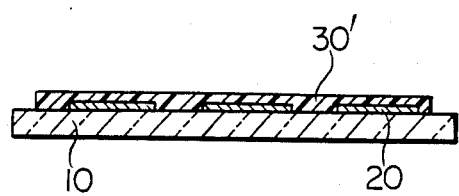

FIG. 1a shows part of a preferred embodiment of the liquid crystal color display device of the present invention. Referring to FIG. 1a showing only one of a pair of opposed transparent substrates 10 of a liquid crystal color display device, for example, a liquid crystal display device of a twisted nematic type in which nematic liquid crystal material is sandwiched between electrodes, and further two parallel polarizing plates are placed one across the liquid crystal from the other, so that activated areas of the liquid crystal material transmit light and unactivated areas do not, patterned electrodes 20 are formed on the transparent substrate 10, and a filter layer 30 is formed on each of the electrodes 20. A structure shown in FIG. 1b is a modification of the structure shown in FIG. 1a in that a single filter layer 30' is formed on the electrodes 20 provided on the transparent substrate 10.

The electrodes 20 of desired pattern are first formed by photolithography on the upper or lower transparent substrate 10 of the liquid crystal color display device constituting a liquid crystal color panel. Then, in order to form the filter layers 30 or filter layer 30' on the patterned electrodes 20 provided on each substrate 10, a dyeable material consisting essentially of, for example, an acrylic resin is coated on the substrate 10 and electrodes 20, and, after pre-curing the dyeable material, ultraviolet radiation is directed through a masking pattern to cure necessary portions of the dyeable material. This filtering material may be coated on only the display electrodes 20 as shown in FIG. 1a or may be coated on substantially the entire surface of the substrate 10 as shown in FIG. 1b, except the portions where opposed electrodes are to be electrically connected with each other on the substrate 10 for the purpose of making external connections to the display device on only one of the substrates and where a sealing agent is to be provided.

Figure 2A:
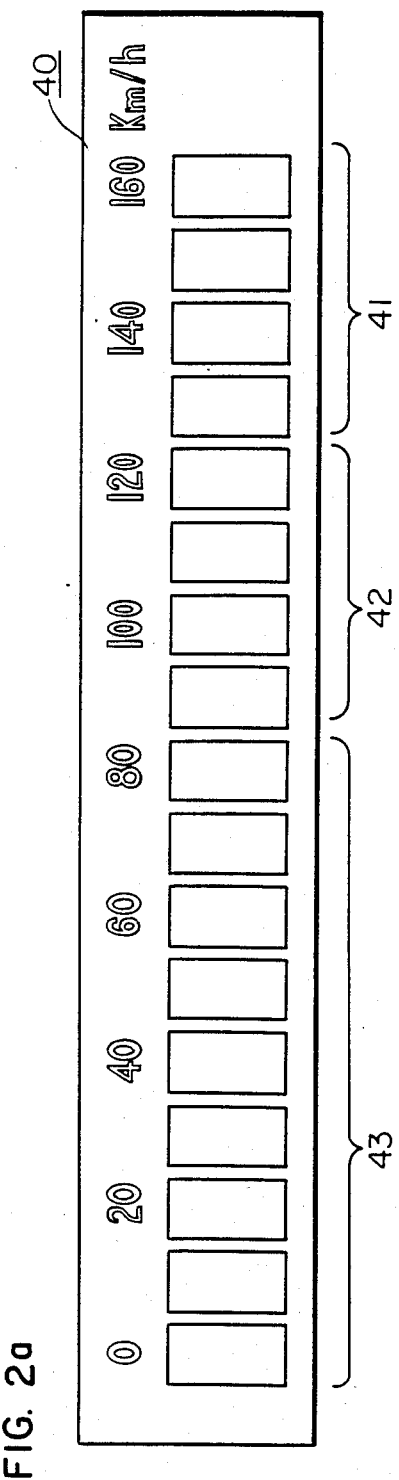
FIGS. 2a, 2b and 2c show other embodiments of the present invention.
Figure 2B:
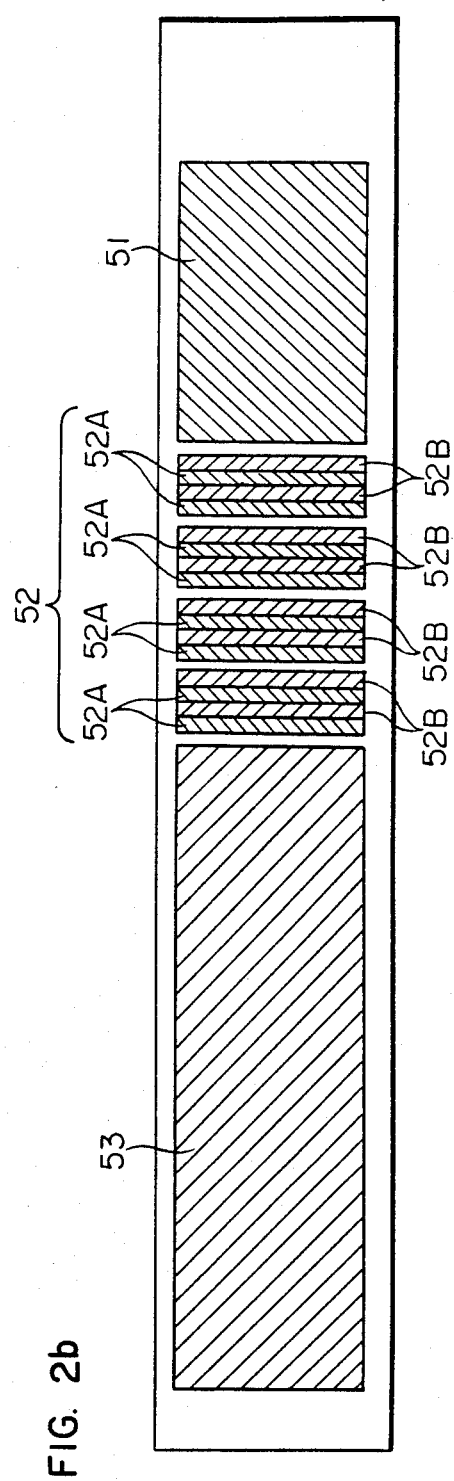

FIG. 2a shows a bar graph display for displaying the speed of an automobile. In FIG. 2a, it is supposed, for example, that a speed lower than and including 80 Km/h is displayed by a green color, a speed between 90 Km/h and 120 Km/h is displayed by a yellow color, and a speed between 130 Km/h and 160 Km/h is displayed by a red color. For this purpose, a red color display element 41, a yellow color display element 42 and a green color display element 43 are formed in a single liquid crystal color display device 40. A process for forming a filter layer for each individual electrode will now be described. First, a filter material coated and then cured on a transparent substrate is covered with a positive type photoresist except the area to be dyed in a first color, for example, the red color. FIG. 2b shows one of the transparent substrates 10 of the liquid crystal color display device 40. In FIG. 2b, sections 51, 52 and 53 correspond to the display elements 41, 42 and 43 in FIG. 2a respectively, and the section 52 is divided into stripe-shaped segments 52A and 52B. The section 51 and the stripe-shaped segments 52A of the section 52 are to be dyed in the red color. The positive type photoresist material suitable for this purpose is, for example, AZ-111S made by Farbwerke Hoechst AG. The substrate 10 (including electrodes, filter layers and photoresist coating) is then immersed in a dye solution to be dyed in red. This dye solution was prepared by dissolving a red dye of trade name RED 1P made by Nippon Kayaku Co., Ltd. into pure water (deionized water) so that the dye dissolution had a concentration of 0.1%, and the resulting structure was immersed in the dye solution for a period of time of 5 to 10 minutes at a dyeing temperature of 65° C. ±5° C.

Then, the photoresist coating is removed by a solvent, an alkaline solution or the like. After removal of the photoresist, a photoresist similar to that described above is used to mask the area except that to be dyed in a second color which is, for example, the green color. That is, the photoresist masks the areas except the section 53 in FIG. 2b corresponding to the display element 43 in FIG. 2a and except the stripe-shaped segments 52B in the section 52 in FIG. 2b corresponding to the display element 42 in FIG. 2a. In a manner similar to that described above, the assembly is immersed in a dye solution to be dyed in green. This dye solution was prepared by dissolving a green dye of trade name GReen 1P made by Nippon Kayaku Co., Ltd. into pure water (deionized water) so that the dye solution had a concentration of 0.1%, and the resulting structure was immersed in the dye solution for a period of time of 15 minutes at a dyeing temperature of 65° C. ±5° C.

Figure 3A:
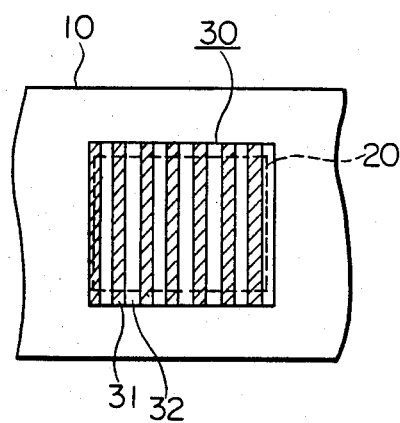
FIGS. 3a and 3b show the major part of other embodiments of the present invention respectively.
Figure 3B:
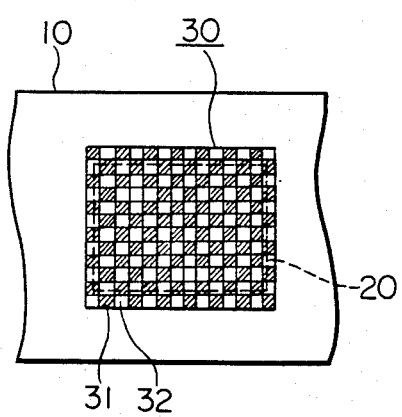
Figure 2C:
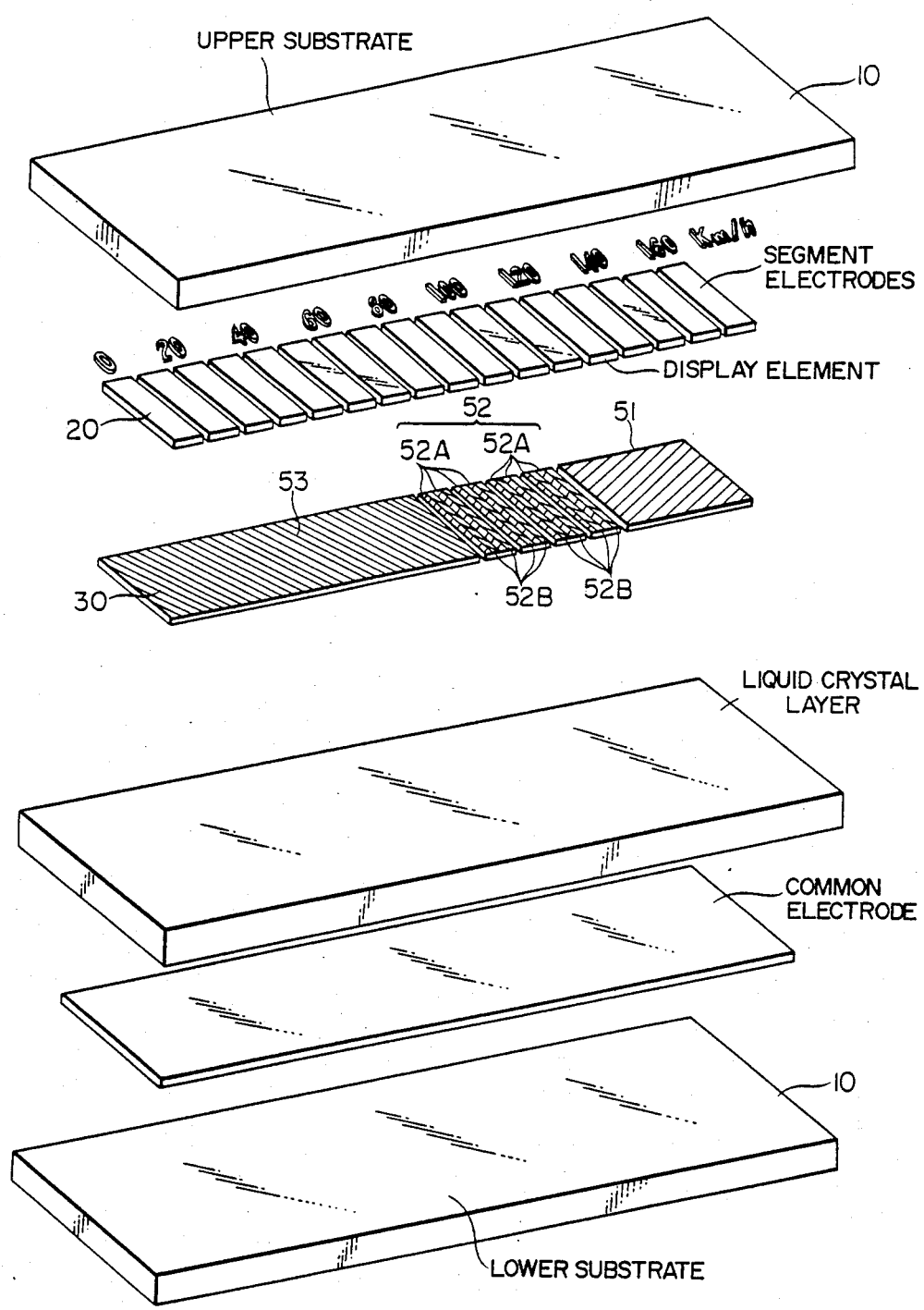

In the manner described above, a red color filter layer (51) for the display element 41, a green color filter layer (53) for the display element 43 and a yellow color filter layer (52) for the display element 42 which yellow color filter layer includes red and green color filtering segments 52A (31) and 52B (32) are formed on the electrodes. The filter layer for the red color display element 41 is entirely colored in red, and the filter layer for the green color display element 43 is colored in green. In the case of the yellow color display element 43, the red color filtering segments 52A (31) and the green color filtering segments 52B (32) are arranged in a stripe pattern as shown in FIG. 3a. However, the red color filtering segments and the green color filtering segments may be arranged in a mosaic pattern as shown in FIG. 3b. The ratio between the area occupied by the red color filtering segments 31 and that occupied by the green color filtering segments 32 is preferably selected to be about 1:1. FIG. 2c shows, in an exploded view, constituent elements of a color liquid crystal display device corresponding to the illustration in FIGS. 2a and 2b. Further, the common electrode may be replaced by a plurality of electrodes in association with the upper segment electrodes. The numbers of the upper and lower electrodes may or may not be the same.

The yellow color display in the embodiments of the present invention utilizes the principle of additive mixture of colors which teaches that, when light from a fine pattern such as a stripe or mosaic pattern which is too fine to be distinguished by the naked eye is incident on the eyes of a man, he senses a color different from the original color of the light. When the embodiment of the liquid crystal color display device of the present invention is used as a meter or the like for automobile use, the width of the stripes is preferably not larger than about 150 μm. This stripe width is preferably as small as possible from the viewpoint of the quality of display. Similarly, when the mosaic pattern is employed for such display devices as for automobile use, the dimension of each segment of the mosaic are preferably not larger than about 200 μm×200 μm. Further, when the number of the red color filtering segments 31 and green color filtering segments 32, that is, the ratio between the total area occupied by the red color filtering segments 31 and that occupied by the green color filtering segments 32 is suitably changed from the value of 1:1, any desired hue between the red color and the green color can be displayed by the display element 42.

Further, in this embodiment of the present invention, the color filter layers 30 and color filtering segments 31, 32 are directly formed on the electrodes. Therefore, the problem of parallax due to the distance between the color filters and the electrodes does not arise, thereby ensuring a display of good quality. However, the color filter layers 30 and the color filtering segments 31, 32 may be formed on the other surface of the transparent substrate on which the electrodes are not provided. This applies also to other embodiments which will be described later.

In this embodiment, two kinds of (e.g., red and green) filter layers and filtering segments are used for attaining a multicolor display. However, it is apparent that three kinds of, or, for example, red, green and blue filter layers and filtering segments may be used.

EMBODIMENT 2

Gelatine type photosensitive films widely used hitherto are dyed in, for example, red and green to provide patterned color filtering films, and such films are laminated on electrodes with a protective film interposed therebetween to provide color filter layers. By such an arrangement, a minimum number of, or only two kinds of color filter layers can provide a display element capable of displaying any desired intermediate hue between one of the colors and the other color, as in the case of EMBODIMENT 1. The color filter layers provided by the laminated films are disposed as in the case of EMBODIMENT 1.

EMBODIMENT 3

A filter layer is formed on substantially the entire surface of a transparent substrate as shown in FIG. 1b, and the portion of the filter layer except the area required for display is rendered opaque by dyeing such a portion with, for example, a black dye, so as to provide a distinct display. Also, such a black color can be generally obtained by consecutive dyeing with dyes of three primary colors.

In the embodiments of the present invention, formation of the filter layers on the electrodes provided on the inner surface of the transparent substrate is effective as described already in that parallax between the filter layers and the electrodes due to the thickness of the substrate does not occur unlike the case where the filter layers are formed on the outer surface of the substrate or on another polarizing plate. However, in order to prevent direct contact between the filter layers and the liquid crystal layer, a material which will not adversely affect the optical properties of the liquid crystal color display device or deteriorate the liquid crystal material even when it makes contact with the liquid crystal, for example, an acrylic or epoxy resin showing a high transmittance, may be coated on the surface of the filter layers to provide a protective coating.

Further, it is possible to reverse the abovementioned order of forming electrodes and thereafter filter layers on the substrates in EMBODIMENTS 1, 2 and 3.

It will be understood from the foregoing description of the present invention that a multi-color display can be attained by formation of a small number of kinds of color filtering segments or color filtering films. Also, by suitably changing the area ratio between the filtering segments of different colors arranged in a stripe pattern or a mosaic pattern, a display element capable of displaying a hue between the colors of the color filtering segments. Therefore, a liquid crystal color display device capable of displaying multiple colors can be provided by a simple manufacturing process. Further, lamination of the color filtering films with protective films interposed therebetween provides the effect similar to that described above.

We claim:

1. A liquid crystal color display device comprising:
at least one first patterned electrodes and at least one second electrodes formed on a pair of opposed transparent substrates, respectively, for applying an electric field across a liquid crystal layer sandwiched between said first and second electrodes, each of said first electrodes defining, together with a one mating second electrode, a display element operable for display in a particular color; and
a filter layer formed for each of said first electrodes on one of said substrates, said filter layer being supported by said one substrate and placed in an optical path of light having entered the display device, in which the filter layer formed for at least one of said first electrodes includes at least two kinds of plural filtering segments, a first kind of filtering segments among said at least two kinds being made of a material having optical characteristics to pass therethrough light having wavelengths representative of a first color, and a second kind of filtering segments among said at least two kinds being made of a material having optical characteristics to pass therethrough light having wavelengths representative of a second color, said at least two kinds of plural filtering segments being arranged so that the display element including said at least two kinds of plural filtering segments gives, when activated, a display in a color of a hue visually perceived different, as viewed at a distance, from those of said filtering segments.

2. A liquid crystal color display device according to claim 1, in which the filter layer for at least one of said first electrodes other than that associated with said at least two kinds of filtering segments is a solid layer of the same material as that of said first kind of filtering segments and the filter layer for at least one of said first electrodes other than any of the above-mentioned at least one first electrode is a solid layer of the same material as that of said second kind of filtering segments.

3. A liquid crystal color display device according to claim 1, in which the ratio between the total areas of said at least two kinds of said plural filtering segments of said filter layer formed for said at least one first electrode is defined so as to determine the hue of a particular color for said first electrode.

4. A liquid crystal color display device according to claim 3, in which the area of each of said filtering segments is defined so as to provide said total area ratio.

5. A liquid crystal color display device according to claim 3, in which the numbers of said at least two kinds of plural filtering segments are defined so as to provide said total area ratio.

6. A liquid crystal color display device according to claim 1, in which each of said filtering segments is in the form of a stripe.

7. A liquid crystal color display device according to claim 6, in which said stripe has a width substantially not larger than 150 $\mu$m.

8. A liquid crystal color display device according to claim 1, in which said filtering segments are substantially in the form of a rectangle and are arranged in mosaic.

9. A liquid crystal color display device according to claim 8, in which each of said rectangular filtering segments has dimensions substantially not larger than 200 $\mu$m $\times$ 200 $\mu$m.

10. A liquid crystal color display device according to claim 1, in which each of said filter layers is made of a dyed gelatin.

11. A liquid crystal color display device according to claim 1, in which those parts of said filter layer which do not contribute to a display in cooperation with any electrode are opaque.

12. A liquid crystal color display device according to claim 11, in which said opaque parts comprise at least two kinds of filtering segments overlapped.

13. A liquid crystal color display device according to claim 1, in which said first and second colors are red and green, respectively.

14. A liquid crystal color display device according to claim 1, in which said filter layer for each of said first patterned electrodes on said one substrate is formed between said liquid crystal layer and said each first patterned electrode on said one substrate.

15. A liquid crystal color display device according to claim 14, further comprising a protective film formed between said liquid crystal layer and said filter layer.

16. A liquid crystal color display device according to claim 15, in which said protective film is made of an acrylic resin or epoxy resin.

17. A liquid crystal color display device according to claim 1, in which the filter layer formed for at least one first electrode includes a plurality of filtering films laminated with a protective film interposed between the adjacent ones of said filtering films.

* * * * *